United States Patent [19]

Liss

[11] Patent Number: 4,672,519
[45] Date of Patent: Jun. 9, 1987

[54] METHOD FOR CONTROLLING A HVDC POWER TRANSMISSION PLANT AND A CONTROL MEANS EMBODYING THE METHOD

[75] Inventor: Göte Liss, Ludvika, Sweden

[73] Assignee: ASEA Aktiebolag, Vesteras, Sweden

[21] Appl. No.: 822,451

[22] Filed: Jan. 27, 1986

[30] Foreign Application Priority Data

Feb. 4, 1985 [SE] Sweden .............................. 85004893

[51] Int. Cl.⁴ ................................................ H02J 3/36
[52] U.S. Cl. ......................................... 363/35; 363/51
[58] Field of Search ............................... 363/35, 51, 79

[56] References Cited

U.S. PATENT DOCUMENTS 3,883,790  5/1975  Hammarlund et al. ............... 363/35

OTHER PUBLICATIONS

Fink, Carrolla, "Standard Handbook for Electrical Engineers", McGraw-Hill, 1968, 10th edition, Section 14.1–14.53.
Uhlmann, "Power Transmission by Direct Current", Springer-Verlag, 1975, pp. 131–152.
Nozari et al., "Current Order Coordination in Multi-Terminal DC Systems", IEEE vol. PAS 100, No. 11, pp. 4628–4635.
Hauth et al., "Multi-Terminal HVDC Control Techniques . . . ", Sep. 1–9, 1982, Cigré Intl. Conference, Report 14-01.

Primary Examiner—Patrick R. Salce
Assistant Examiner—Jeffrey Sterrett
Attorney, Agent, or Firm—Pollock, Vande Sande & Priddy

[57] ABSTRACT

An HVDC power transmission plant with a rectifier station and an inverter station interconnected by a d.c. power transmission line is disclosed. The plant has a communication link for transmitting control information between the stations, at least one of which having at least two parallel-connected converters. If protective blocking of a faulty converter is made in a faulty station during a period when the communication link is not available, the line voltage and line current are temporarily reduced to zero in the rectifier station. In the faultless station, this state is detected and the minimum value of the control angle of the converters of the faultless station is temporarily increased. After output from the rectifier station has been restored, the line current is measured and the current order in the faultless station is set at the measured value, taking account of the current margin. Thereafter, the minimum value of the control angle is reduced to its normal value, thereby restoring normal operation of the plant.

13 Claims, 6 Drawing Figures

METHOD FOR CONTROLLING A HVDC POWER TRANSMISSION PLANT AND A CONTROL MEANS EMBODYING THE METHOD

TECHNICAL FIELD

This invention relates to a method for controlling a high voltage direct current (HVDC) electrical power transmission plant having two spaced-apart converter stations, interconnected via a d.c. power transmission line, and a telecommunication link for transmission of control information between the stations, at least one of the converter stations having at least two d.c. parallel-connected converters as well as members for the protective blocking of one or these converters upon a fault in the said one converter. The invention also relates to HVDC plant adapted for carrying out the method of the invention.

DISCUSSION OF PRIOR ART

Power transmission plants and control methods of the kind mentioned in the introduction are previously known, for example from:

Fink, Carrolle: Standard Handbook for Electrical Engineers, 10th edition (McGraw-Hill, 1968), sections 14-1 to 14-53;

Uhlmann: Power Transmission by Direct Current (Springer-Verlag 1975).

The telecommunication link used to transmit control information between the converter stations may, for example, be a carrier frequency link or a radio relay link. Normally, it transmits information about the existing current order from one station to the other, as well as other information necessary for proper operation of the plant, for example information about faults arising or switchings employed in the stations. There is a finite risk of the telecommunication link becoming inoperative, and it is highly desirable that the plant should be able to continue operation in the event of a temporary failure of the telecommunication link, and to the greatest possible extent this should be done in an undisturbed manner. Certain methods for making this possible are already known and these can be employed so long as the converters of the plant are operating properly.

In a plant which has converter stations with two or more a.c./d.c. converters which are operating in parallel on the d.c. side, in the event of a fault arising in one of the converters, the faulty converter will be blocked in a known manner and thus made inoperative. However, should this occur during a period when the telecommunication link has temporarily failed, the following situations will arise:

(a) in the case of a fault in one converter of the station which is operating as the rectifier, the maximum current of this station will be lower than the current order of the other station acting as the inverter and the transmitted power will drop to zero;

(b) in the case of a fault in one converter of the station which is operating as the inverter, the remaining converter(s) in that station will be overloaded, again resulting in an interruption of operation of the plant.

In the two publications:

Nozari, Grund, Hauth: "Current Order Coordination in Multiterminal DC Systems", IEEE Trans. on Power Apparatus and Systems, Vol. PAS-100, No. 11, November 1981, pp. 4628–4635, and Hauth, Nozari, Breuer, Melvold: "Multi-terminal HVDC Control Techniques for Future Integrated AC-DC Networks", Cigré International Conference on Large High Voltage Electric Systems, 1982 Session, 1-9 September, Report 14-01, A method is described for restarting a multi-terminal d.c. transmission system after a drop out of one or more converter stations in the case of an unavailable telecommunication link. The remaining stations are given special balancing characteristics, selected on the basis of a predetermined line voltage and predetermined measurement values. After restart, a number of working points for the remaining converters are obtained. The current of each such converter is measured and made the starting-point of a current order, which is obtained by adding a certain part of the current margin to the measured current or subtracting a certain part of the current margin from the measured current.

The above-mentioned publications do not described converter stations with a plurality of parallel-operating converters and the special problems which, in the event of a failure of the telecommunication link, arise when a protective blocking of a converter in such a station occurs. The system described in the two publications noted above is furthermore complicated, for example in that the characteristics of all the remaining stations are changed, in that specially calculated balancing characteristics are used, and in that the current margin is distributed, in a manner which is not disclosed in detail, between the remaining stations.

OBJECT OF THE INVENTION

One object of this invention is to provide a simple and uncomplicated method for enabling continued operation of an HVDC system while utilizing the maximum transmission capacity of the remaining converters in a plant having at least two parallel-operating converters in one or in both stations of the system and in those cases where protective blocking of one converter of a station takes place during a period when the telecommunication link between the stations is not available.

SUMMARY OF THE INVENTION

According to the invention, in the case of protective blocking of a converter in one of the stations, the voltage of the rectifier station is temporarily reduced to a low value, suitably by increasing the control angle α to a value corresponding to inverter operation in order rapidly to reduce the current to zero. In the intact or faultless station, the line voltage is sensed. If this voltage is lower than a predetermined low value (preferably close to zero) during a certain period, the minimum value of the control angle of the converters of the station is increased from a normal value to a predetermined value (which value is determined by whether the station is operating as the rectifier station or the inverter station). In this way a point of intersection is obtained between the characteristics of the two stations and a working point is assumed by the plant after the cancellation of the temporary voltage reduction of the rectifier station. The line current is measured in the faultless station, and the current order of that station is set in accordance with the measured value. Thereafter the minimum value of the control angle is reduced to its normal value.

In this way, in the case of protective blocking of a converter when the telecommunication link is not available, stable operation with the greatest possible transmitted power can be rapidly and simply restored and maintained. The method is preferably carried out by automatically acting control means, and the additions required to the control equipment are small.

To safeguard against improper initiation of the above-mentioned procedure, according to one embodiment of the invention, the line current is also sensed in the faultless station, and the procedure is initiated only if both the line voltage and the line current are zero for a certain period of time.

When, after the increase of the minimum value of the control angle, operation is started at the provisional working point, measurement of line current and setting of current orders in the intact converter station can be initiated. According to one embodiment of the invention, this is done by sensing the line voltage—after the minimum value of the control angle has been increased—and comparing the line voltage with a reference value, which is chosen in such a way that it will, with certainty, be exceeded at the provisional working point. If the sensed line voltage exceeds the reference value—preferably for a certain, predetermined period of time to ensure stable operation of the provisional working point—the current measurement and the setting of the current order are initiated.

A reduction of the line voltage may be caused by a fault in the a.c. voltage network of the faultless converter. According to one preferred embodiment of the invention, the intact converter is provided with members preventing an increase of the maximum value of the control angle upon a fault in the a.c. voltage network.

To utilize the converters remaining after a protective blocking to the maximum extent and to obtain stable operation with so-called current margin control also after resumed operation, the current order of the intact converter is preferably formed as follows:
- if the converter operates as a rectifier, by adding to the measured current an amount corresponding to the desired current margin, and
- if the converter operates as an inverter, by subtracting said amount from the measured current.

BRIEF DESCRIPTION OF THE DRAWINGS

The invention will now be described in greater detail, by way of example, with reference to the accompanying drawings, wherein.

DETAILED DESCRIPTION OF ONE EMBODIMENT OF THE INVENTION

Figure 1:
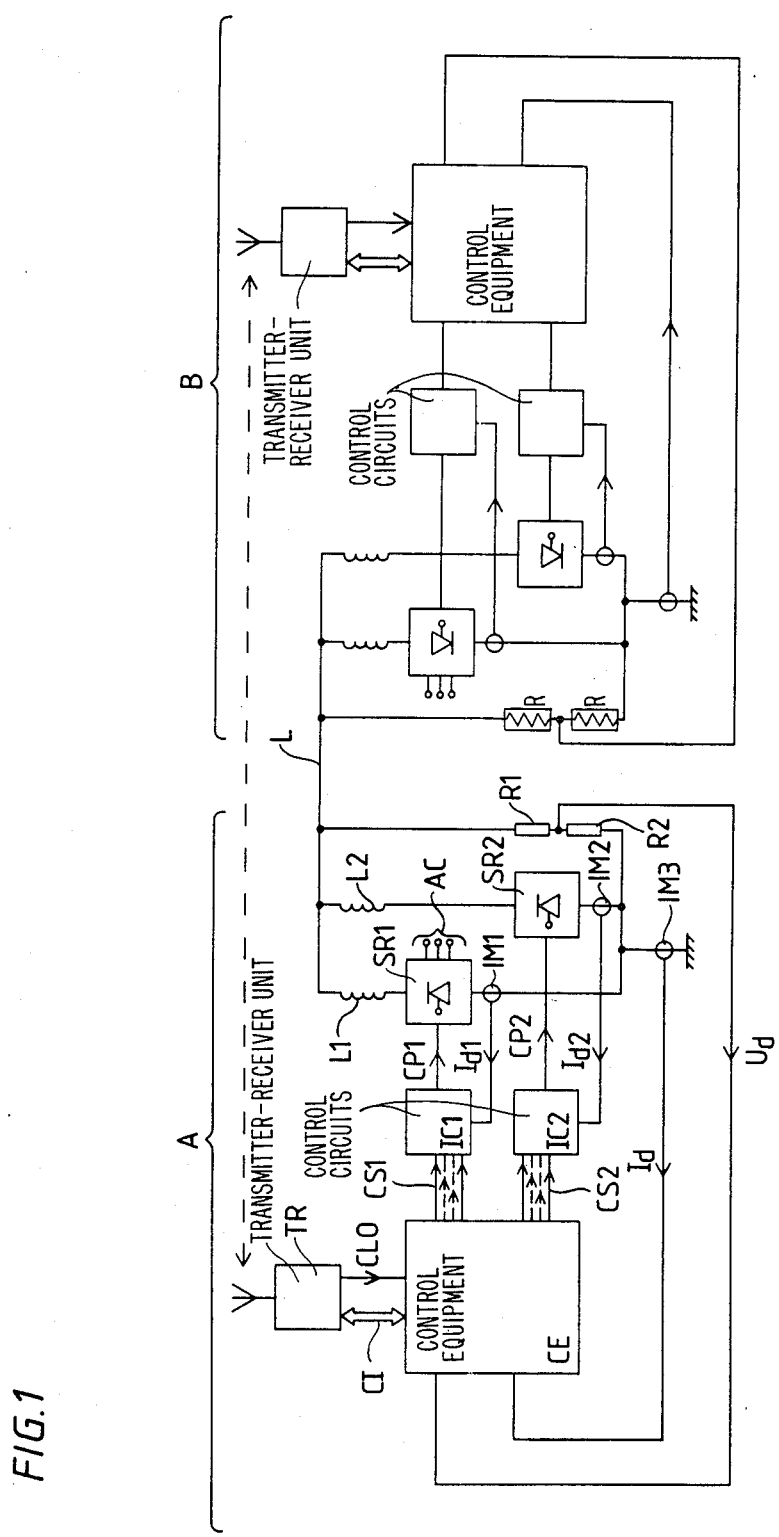
FIG. 1 is a general diagram of a d.c. power transmission plant according to the invention.

FIG. 1 shows a general diagram of a plant according to the invention for the transmission of electrical energy by means of high voltage direct current (HVDC). The plant comprises two converter stations A and B. The two converter stations are identically constructed, and only station A will be described hereafter. Each of the stations A and B is connected to a respective threephase a.c. voltage network AC. The stations are interconnected by means of a d.c. power transmission line L, which may be an overhead cable or a subterranean or underwater d.c. cable. In operation of the plant, one station operates as a rectifier and the other station operates as an inverter. Depending on in what mode a certain station is operating at the moment in question, the control and protective functions of the plant will operate in different ways, as will be clear from the following.

The plant shown in FIG. 1 is a single-pole plant with the return conductor for the direct current being the ground. However, the invention can just as well be applied to, for example, a two-pole transmission system. Each one of the two poles can then be formed in the manner shown in FIG. 1.

A telecommunication link is provided for the transmission of control information between the two stations of the plant. This link may consist of a carrier frequency transmission link or of a microwave link. In FIG. 1 the link is shown as a transmitter—receiver unit TR, provided in each station. Over this link information, which is necessary for maintaining coordinated operation of the two converter stations, is transmitted, for example the current order in question, and information about the switching and blocking states of the two stations. This information is exchanged between control equipment units CE of the two stations via the link and is designated by the double-headed arrow CI in FIG. 1.

In the case of a temporary failure of the communication link, the link equipment TR arranged in one station delivers a signal CLO to the control equipment CE of that station. How this signal CLO is utilized will be clear from the following description.

In the example shown, each converter station comprises two a.c./d.c. converters SR1 and SR2 which are parallel-connected on their d.c. voltage sides (although it should be realized that the invention can just as well be applied to plants which comprise stations with more than two parallel-operating converters). The converters SR1, SR2 are connected to the d.c. line L by way of respective smoothing inductors L1 and L2.

Each converter SR1, SR2 is provided with a separate control circuit IC1 and IC2. From the control equipment CE, the control circuit IC1 is supplied with certain control information CS1, which, for example, consists of a current order for the converter SR1 and certain other control signals (described below). From a current measurement device IM1, the control circuit IC1 is further supplied with information about the direct current $I_{d1}$ of the converter SR1. The control circuit IC1 delivers control pulses CP1 to the thyristors in the converter SR1. Corresponding circuits are provided for the converter SR2 so that this receives control pulses CP2.

From a voltage divider, consisting of resistors R1 and R2, the control equipment CE is supplied with information about the measured line voltage $U_d$. A current measurement member IM3 delivers to the control equipment CE a signal $I_d$, which is a measure of the existing direct current of the station (alternatively, of course, $I_d$ can be obtained as the sum of $I_{d1}$ and $I_{d2}$).

Figure 2:
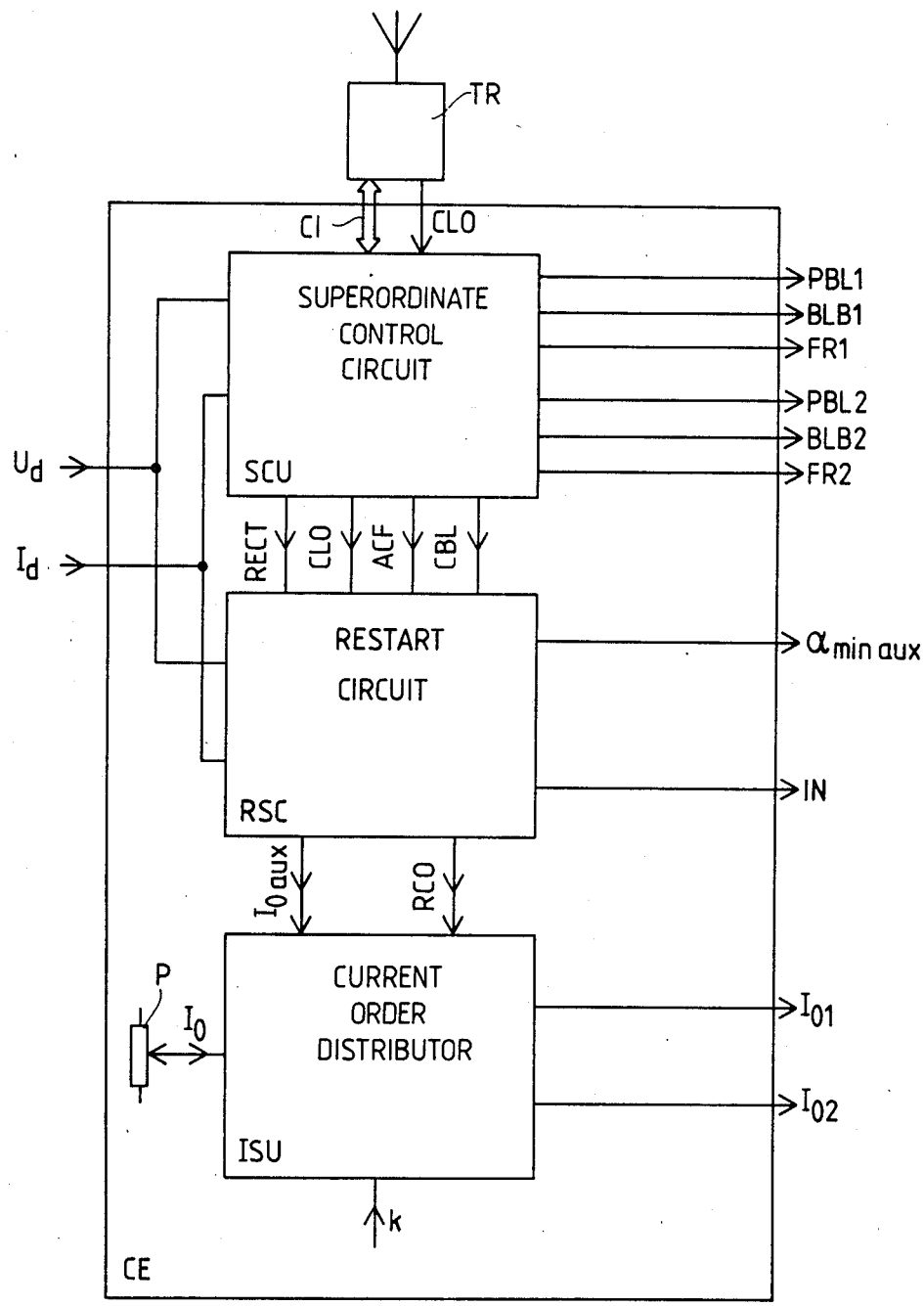
FIG. 2 shows in greater detail the construction of the control equipment of one station in the plant of FIG. 1.

FIG. 2 shows schematically the configuration of the control equipment CE. It comprises a superordinate control circuit SCU, a restart circuit RSC (see further FIG. 4), and a current order distributor ISU.

The superordinate control circuit SCU is built up in a manner known per se. It receives, inter alia, measuring signals $U_d$ and $I_d$, it exchanges control information CI with the second station of the plant via the telecommunication link, and it delivers certain control and blocking signals to the converters of the station. Furthermore, it includes conventional protective circuits, for example a line protector, which is arranged to detect ground faults on the line L by sensing a low or rapidly falling d.c. voltage, possibly in combination with a direct current which is different from zero. Further, the control circuit SCU is arranged to deliver, upon a fault arising in one or other of the converters SR1, SR2 of the station, a signal, PBL1 and PBL2, respectively, for permanent blocking of the faulty converter. In those cases where the station is working in inverter operation, the control circuit SCU is adapted, in the case of protective blocking of a faulty converter, also to temporarily block the second converter of the station or to control it down to a control angle $\alpha = 90°$. This temporary measure has such a duration that the line protector of the other converter station, which is functioning as a rectifier, has time to come into operation, for example for some 10–100 milliseconds. A temporary blocking of the faultless converter is achieved by arranging a bypass path for the direct current in or near the converter. The signals for this temporary measure, which are delivered from the control circuit SCU, are designated BLB1 and BLB2. Further, the control circuit SCU is adapted to deliver signals, FR1 and FR2, to the converters of the station for forced voltage reduction of those converters, preferably by changing the converter to operate in full inverter operation with maximum voltage. These signals are only given in those cases where the station is working in rectifier operation. The signals are initiated either by the line protector of the station entering into operation or by one of the converters of the station being blocked. This forced voltage reduction may, for example, have a duration of a few hundreds of milliseconds but should be as short as possible. The control circuit SCU at all times contains information about the status of the converter station and delivers to the restart circuit RSC a logical signal RECT (which, if it is high, indicates that the station is operating as a rectifier and if it is low, indicates it is operating as an inverter), a signal CLO, which indicates that the communication link is out of operation, a signal ACF, which indicates a fault in the a.c. voltage network to which the station is connected, and a signal CBL, which indicates that one of the converters of the station has been protectively blocked.

The restart circuit RSC, which will be described in greater detail below with reference to FIG. 4, receives the measurement signals $U_d$ and $I_d$ and the abovementioned status information RECT, CLO, ACF and CBL. The restart circuit delivers to the control circuits of the two converters the signal $\alpha_{minaux}$ and IN, the functions of which will be described in greater detail below. Further, the circuit delivers to the current order distributor ISU, the signals $I_{Oaux}$ and RCO. The current order distributor ISU receives, for example from a potentiometer P, a current order $I_O$ for the station. In a manner known per se, this current order is distributed between the two converters of the station, each converter receiving its current order $I_{O1}$ and $I_{O2}$, the sum of which is generally equal to $I_O$. The distribution of the current order $I_O$ between the two converters is determined by a control signal k and may, for example, be determined by the relationship between the maximum currents of the two converters. In those cases where the two converters of the station are identical, the current order is suitably distributed so that each of the two converters receives half of the order.

Figure 3:
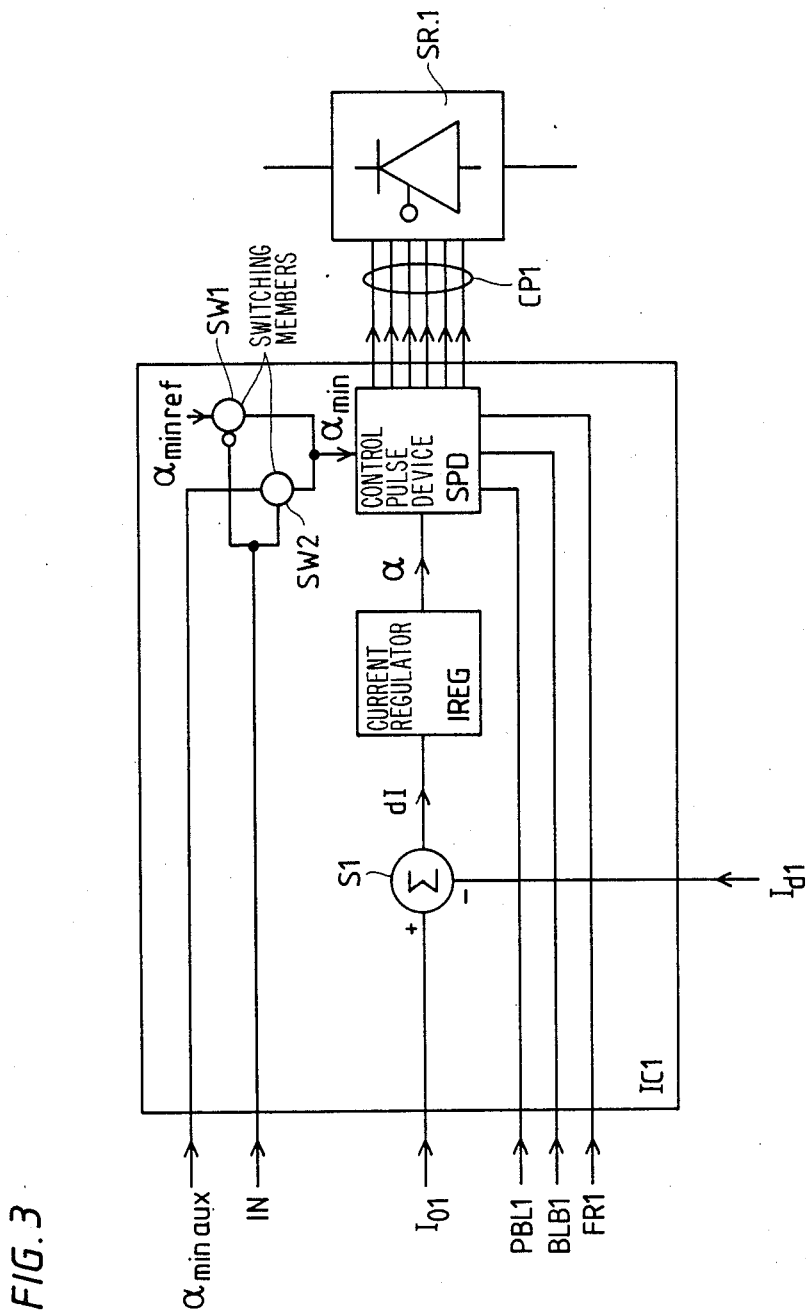
FIG. 3 shows the construction of the current control circuit of one of the converters in one station of the plant of FIG. 1.

FIG. 3 shows the control circuit IC1 of the converters SR1. The control circuit IC2 of the converter SR2 is constructed in exactly the same way. The current order $I_{O1}$ of the converter is supplied to a difference generator S1, which forms a current error dI as the difference between the current order and the direct current $I_{d1}$ of the converter. The current error is supplied to a current regulator IREG, which delivers a control angle determining signal $\alpha$ to a control pulse device SPD. The control pulse device delivers control pulses CP1 with the desired control angle to the thyristors of the converter SR1. The signals PBL1 and BLB1, supplied from the control equipment CE to the control pulse device SPD, cause a blocking of the normal control signals CP1 to the converter. In addition, the signal BLB1 causes the establishment of a bypass path for the direct current, for example by causing the control pulse device SPD to deliver a permanent control pulse to two thyristor valves in the converter which belong to the same a.c. voltage phase. The signal FR1 causes forced adjustment of the converter SR1 to full inverter operation. In a known manner a lower limit to the control angle $\alpha$ is set in the control pulse device SPD, and typical values for this limit are 5° in rectifier operation and 100° in inverter operation. The signal IN, obtained from the restart circuit RSC, causes an increase in the minimum value of the control angle from the normal value to a value $\alpha_{minaux}$ which is also obtained from the restart circuit RSC. This has been symbolically shown in FIG. 3 by providing the control pulse device with an input arranged such that the signal $\alpha_{min}$ supplied to the input determines the minimum value of the control angle. The normal value $\alpha_{minref}$ is supplied to the input via an electronic switching member SW1 (note that the normal value is different in rectifier and inverter operation), and the signal $\alpha_{minaux}$ is supplied to the input via an electronic switching member SW2. The two switching members SW1 and SW2 are controlled by the signal IN from the restart circuit RSC. When the signal IN is "low", the mentioned input of the control pulse device is supplied with the normal value $\alpha_{minref}$, and when the signal IN becomes "high", the input is supplied with the value $\alpha_{minaux}$. As will be clear from the description of the restart circuit below, the value $\alpha_{minref}$, and therefore the signal IN will cause an increase of the minimum value of the control angle $\alpha$.

Figure 4:
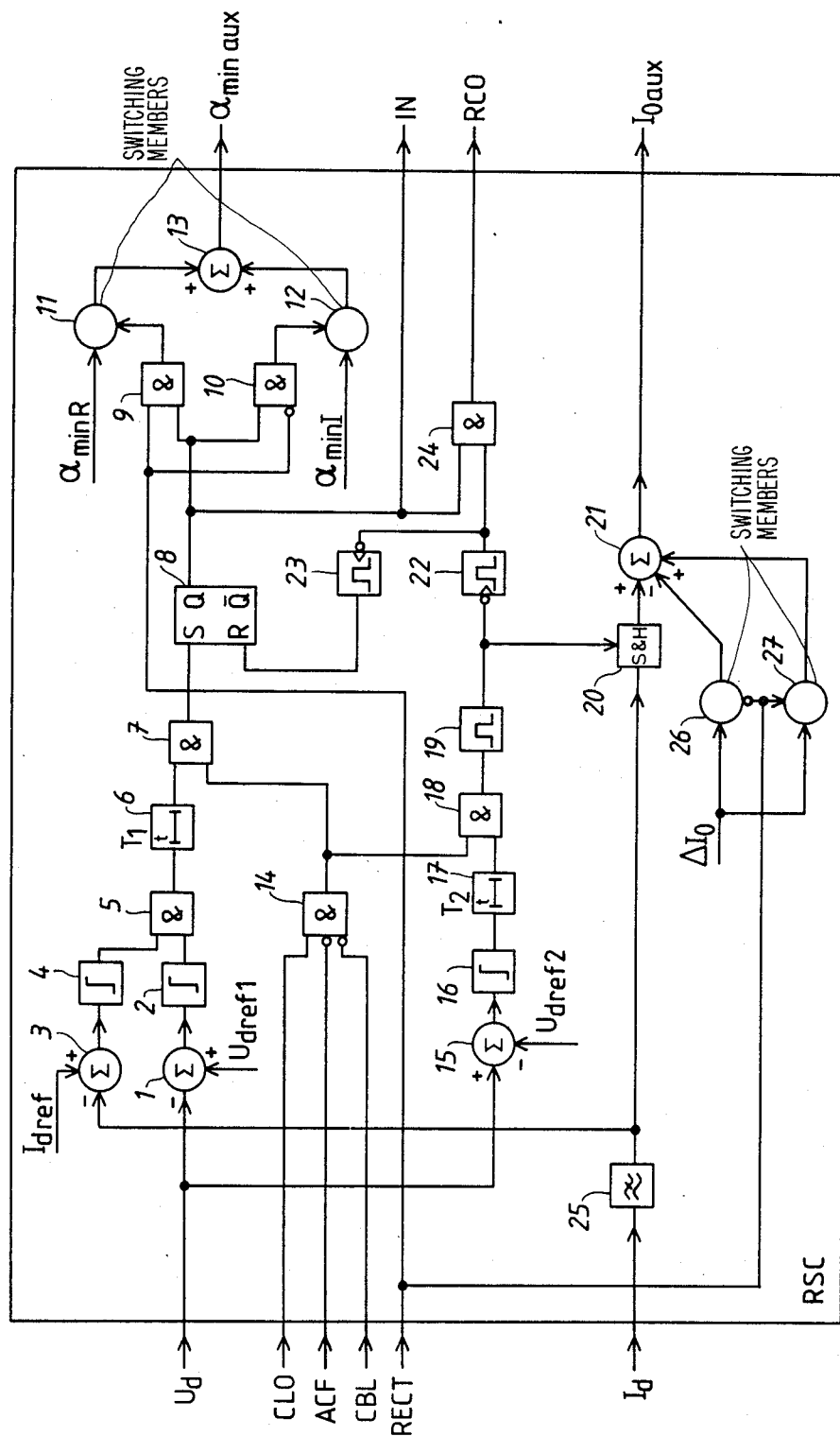
FIG. 4 shows the construction of the restart circuit of the control equipment of FIG. 2, and FIGS. 5a and 5b show the voltage/current characteristics of the converter stations in the event of protective blocking of a converter in the rectifier and inverter stations, respectively, of the plant shown in FIG. 1.

FIG. 4 shows an example of the embodiment of restart circuit RSC included in the control equipment CE. The operation of the restart circuit is initiated by the line voltage $U_d$ and the line current $I_d$ being both nearly equal to zero for a certain predetermined time. This is detected by supplying the measured line voltage $U_d$ to a comparator 1, where it is compared with a voltage reference value $U_{dref1}$, which is only somewhat above zero. When $U_d$ is lower than $U_{dref1}$, the output signal from the comparator is high, and the output signal of a level detector 2 to an AND-circuit 5 is also high. The measured line current $I_d$ is filtered in a low pass filter 25 by a time constant of, for example 10 ms, and is supplied to a comparator 3 where it is compared with a reference value $I_{dref}$ which somewhat exceeds the value zero. If the line current $I_d$ falls below the value $I_{dref}$, the comparator delivers to the AND-circuit 5, via a level detector 4, a signal which is high. The output signal from the AND-circuit 5 is supplied to a delay circuit 6 with a closing delay $T_1$. Thus, if both $LU_d$ and $I_d$ have been zero (lower than their reference values) during a time interval of duration $T_1$, the output signal from the delay circuit 6 to an AND-circuit 7 will be high. The signals CLO, ACF and CBL, described above, are supplied to an AND-circuit 14. The output signal from this circuit is high provided that the telecommunication link is not available, that there is no fault in the a.c. voltage network connected to the station, and that none of the converters of the station is protectively blocked. The output signal from the AND-circuit 14 is supplied to a second input of the AND-circuit 7, the output signal of which is high under the conditions described in the foregoing. This output signal is supplied to a bistable flip-flop 8, which is then put in the state in which its output signal Q is high. The output signal from the flip-flop 8 is supplied to AND-circuits 9, 10 and 24, and the output signal from the flip-flop 8 also constitutes the signal IN described above, which executes an increase of the minimum value of the control angle for the converters included in the station. The abovementioned signal RECT, which indicates that the station is working in rectifier operation, is supplied to inputs of the AND-circuits 9 and 10. The AND-circuit 9 controls a switching member 11, and the AND-circuit 10 controls a switching member 12. The switching members forward one of the two predetermined minimum values $\alpha_{minR}$ and $\alpha_{minI}$ to a summation member 13, whose output signal $\alpha_{minaux}$ will be constituted either by $\alpha_{minR}$ or by $\alpha_{minI}$. When the station is operating as a rectifier, the signal RECT is high and $\alpha_{minaux}$ assumes the value $\alpha_{minR}$, which may, for example, be 30°. If the station is operating as an inverter, the signal RECT is low and the signal $\alpha_{minaux}$ assumes the value $\alpha_{minI}$, which, for example may be 130°. Generally, the choice of $\alpha_{minR}$ is determined such that the characteristic of the station operating as a rectifier and with increased control angle minimum value is with certainty below the characteristic of the inverter station in undisturbed operation. The value $\alpha_{minI}$ is thereafter chosen so that the characteristic of the inverter working with increased control angle is with certainty below the characteristic of the rectifier station operating with increased control angle minimum value. The necessary safety margins when choosing these values are determined, inter alia, by the possible variations in the voltage of the a.c. voltage network.

The parts of the restart circuit now described initiate the operation of the circuit and cause such a change of the characteristic of the intact faultless converter station that a working point is obtained, which is assumed by the transmission when the voltage reduction of the rectifier station is cancelled. The circuits 15-19 indicate that a stable operating state has thereafter been adopted. The output signal of the comparator 15 is high if the line voltage $U_d$ exceeds a referece value $U_{dref2}$, which is chosen such that the reference value is lower, by a necessary margin, than the voltages which can be obtained during operation with increased control angale minimum value. The output signal from the level flip-flop 16 then becomes high and is supplied to a delay circuit 17 with a closing delay T2, which similarly to the above-mentioned delay time $T_1$ of the circuit 6 may be, for example, 50-100 ms. The output signal from circuit 17, as well as the output signal from the AND-circuit 14, is supplied to the inputs of an AND-circuit 18, whose output signal becomes high when stable operation has been assumed at the provisional working point. A monostable circuit 19 then delivers a short pulse which activates a sample-and-hold circuit 20. This circuit 20 senses and stores the line current $I_d$ in question.

In a summation circuit 21, the current reference $I_{Oaux}$ is formed, in rectifier operation (the signal RECT being high), by adding a current margin $\Delta I_O$ to the measurement value stored in the circuit 20 and, in inverter operation (the signal RECT being low), by subtracting the current margin from the current measurement value stored in the circuit 20. The switching between addition and subtraction is carried out by the signal RECT via the switching members 26 and 27.

The output pulse from the pulse generator 19 is also supplied to a differentiating and inverted input of a monostable circuit 22 which delivers a pulse when the pulse from the circuit 19 becomes low. The duration of the output pulse from the circuit 22 is adapted such that reading and storage of the line current and calculation of the current order value $I_{Oaux}$ can be carried out with certainty before the pulse becomes low again. The output pulse is supplied to the other input of the AND-circuit 24, the first input of which is supplied with the signal Q from the bistable flip-flop 8 as has been mentioned previously. Provided that the signal Q is high, that is, that an increase of the control angle minimum value has been carried out, the pulse from the circuit 22 will cause the transmission of the signal RCO from the circuit 24. As described above, this signal as well as the signal $I_{Oaux}$ are supplied to the current order distributor ISU. The signal RCO influences the current order distributor in such a way that from there on it will use, instead of the previously used current order $I_O$, the value $I_{Oaux}$ as the current order for the station. The output signal from the circuit 22 is supplied to an inverted and differentiating input of a monostable circuit 23 which, when the output pulse from the circuit 22 becomes low, delivers an output pulse to a reset input R of the bistable flip-flop 8. The signal Q from this flip-flop then becomes low, which means that the temporarily increased control angle minimum value is restored to its normal value.

Figure 5A:
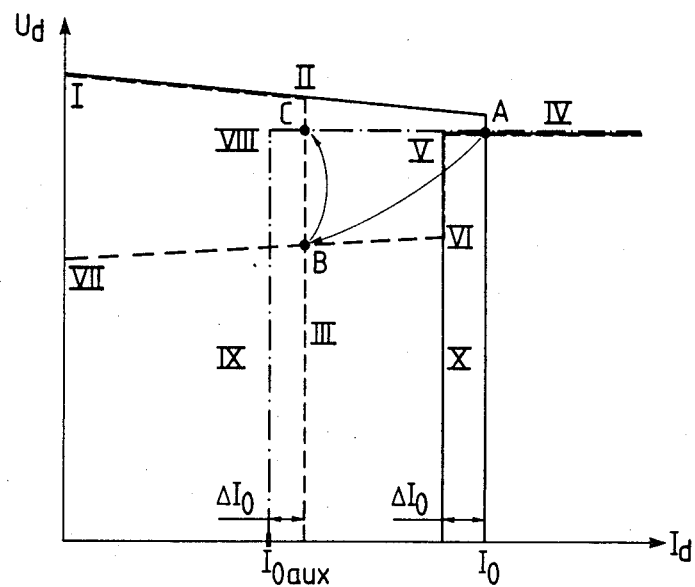

The mode of operation of the plant will now be described with reference to FIGS. 5a and 5b assuming that a protective blocking of a converter in the rectifier station takes place. Prior to the protective blocking, the two converter stations have the characteristics shown in continuous lines, which intersect each other at point A which is the working point of the plant. The plant will operate at the set current order value $I_O$. In the case of protective blocking of a converter in the rectifier station, the remaining converter will have the characteristic shown by I-II-III in FIG. 5a. As mentioned above, in the case of protective blocking of a converter in the rectifier station, a forced voltage reduction of the remaining converter will take place. Line voltage and line current therefore drop rapidly down to zero, and in the inverter station the restart circuit RSC starts operating. When the restart circuit has detected that the line voltage and the line current are both zero, the restart circuit increases the minimum value of the control angle in the inverter station, and the characteristic of this station assumes the appearance according to IV-V-VI-VII. This characteristic intersects the characteristic of the remaining converter(s) of the rectifier station at the point B in FIG. 5a. When, for example after a few hundred ms, the temporary voltage reduction of the remaining converter(s) of the rectifier station has been interrupted, the plant will operate at the working point B. In the manner described above, the restart circuit measures the line current at this working point and forms the new current order $I_{Oaux}$ of the inverter station by subtracting from the measured current the current margin $\Delta I_O$. Thereafter, the temporary increase of the control angle minimum value of the inverter station is interrupted, which results in the characteristics of the station assuming the appearance according to IV-VIII-IX. The plant will now continue to operate at the working point C and transmit current with a capacity which is limited only by the current handling capacity of the remaining intact converters in the rectifier station.

Figure 5B:
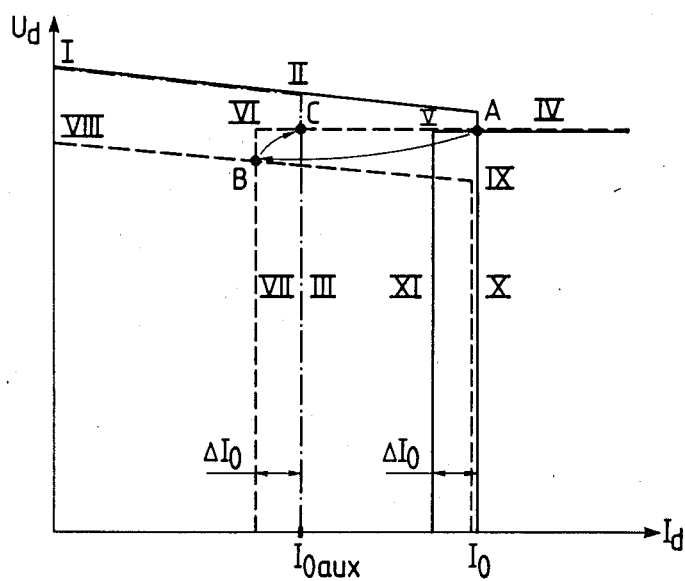

With reference to FIG. 5b a description will now be given of the operation of the plant in the case of a protective blocking of one faulty converter in the converter station which is working as an inverter. Prior to the protective blocking, the converter stations have the characteristics shown by the two continuous lines in FIG. 5b and the plant operates at the working point designated A, just as in FIG. 5a. As described above, in the case of a protective blocking of one converter in the inverter station, the remaining converter(s) will also be temporarily blocked while establishing a bypass path, or it will be reduced. The line voltage during inverter operation will therefore be zero, and the line protector in the rectifier station will interpret this as a line fault and will deliver a signal to the converters of the rectifier station, ordering a forced reduction to full inverter operation. Both the line voltage and the line current will therefore rapidly drop to zero in the rectifier station and the restart circuit RSC in this station will start operating in the manner described above. The characteristic of the converter(s) in the inverter station which remains after the protective blocking is designated IV-V-VI-VII in FIG. 5b. After the temporary increase of the control angle minimum value in the rectifier station, which is carried out by the restart circuit of that station, the rectifier station has the characteristic designated VIII-IX-X. As soon as the reduction of the converters of the rectifier station has been cancelled, the plant will therefore assume the working point shown at B in FIG. 5b. The restart circuit of the rectifier station measures the line current and forms the new current reference $I_{Oaux}$ of the rectifier station by adding the current margin $\Delta I_O$ to the measured line current. After cancelling the temporary increase of the control angle minimum value of the rectifier station, the plant will therefore assume the working point C. The operation of the plant is thereafter continued with full voltage and with a current which is only limited by the current handling capacity of the converters remaining in the inverter station after the protective blocking.

In the foregoing description it has been assumed that when a converter in a converter station is protectively blocked, the remaining converter or converters is/are given current orders the sum of which is as great as the sum of the current orders prevailing prior to the protective blocking. However, after the protective blocking, the sum of the current orders is limited to the maximum current handling capacity of the remaining converter or converters.

As will be clear from the above description, the result of the mode of operation of the restart circuit is a reduction of the current order for the faultless converter station, that is, the station in which no protective blocking has taken place. This reduction can be distributed evenly between the converters of the station, or the reduction can be made by reduction of the current order for only one or some of the converters of the converter station. Alternatively, one or more of the converters in the intact station can be blocked.

The invention is not limited to the specific embodiment described since modifications thereof are possible within the scope of the following claims.

I claim:

1. A method for control of a high voltage direct current power transmission plant, the plant having first and second converter stations, one of the stations operating as a rectifier station and the other of the stations operating as an inverter station, said two stations being interconnected by a d.c. power transmission line, the plant further having a telecommunication link for the transmission of control information between the two stations, at least the first station having at least two a.c./d.c. converters which are parallel-connected on their d.c. sides, the plant furthermore having means for the protective blocking of one of these converters upon a fault arising in that converter;

wherein, for maintaining the operation of the plant in case of protective blocking of a faulty converter in said first station when the telecommunication link is not available, the method comprising the step of:

temporarily reducing the voltage in that part of the plant operating as the rectifier station to a low value; and wherein in the second station, where no protective blocking has occurred, the method further comprising the steps of:

sensing the d.c. voltage of the transmission line during a first predetermined time interval and, if the thus-sensed value is lower than a first predetermined low value, increasing the minimum value for the control angle of the converters of the second station from its normal value to a predetermined value chosen in dependence on whether the second station is operating as a rectifier or as an inverter, after termination of the voltage reduction of the rectifier station, measuring the current in the transmission line and setting the current order in the second station in accordance with the measured line current value, and thereafter, reducing the minimum value of the control angle to its normal value.

2. A method according to claim 1, wherein the increasing step comprises:

increasing the minimum value of the control angle only if both the line voltage is lower than said first predetermined value and the line current is lower than a predetermined low value during said first predetermined time interval.

3. A method according to claim 1, wherein, after the increase of the minimum value of the control angle, the measuring step comprises:

measuring the line current only when a second predetermined value on the line voltage has been reached.

4. A method according to claim 3, wherein the measuring step comprises:

measuring the line current only when said second predetermined value of the line voltage has been exceeded during a second predetermined time interval.

5. A method according to claim 1, wherein in the second station, the increasing of the minimum value of the control angle step and the subsequent steps are carried out only if the a.c. voltage network, to which the second station is connected, is intact.

6. A method according to claim 1, wherein in the second station, the current order is produced by adding to the measured value of the line current a value corresponding to a desired current margin if the second station is operating as the rectifier station, and by subtracting from the measured current value a value corresponding to the current margin if the second station is operating as the inverter station.

7. An HVDC power station transmission plant having a first and a second converter station, the stations being interconnected via a d.c. power transmission line one of the stations operating as a rectifier station and the other of the stations operating as an inverter station, the plant further having a telecommunication link for the transmission of control information between the stations, at least the first station having at least two converters which are parallel-connected on their d.c. sides, the plant furthermore having means arranged to protectively block the converters, the plant comprising:

means arranged to temporarily reduce the d.c. voltage of the station operating as a rectifier when a faulty converter in said first station has been protectively blocked; and, in said second station, the plant further comprising:

first voltage sensing and time measuring means arranged to sense whether the line voltage is lower than a first, low reference value during a first time interval and to influence control angle limiting means for increasing the minimum value for the control angle of converters of the second station from a normal value to a predetermined value, means arranged to select said predetermined value in dependence on whether the second station operates as a rectifier or as an inverter, a current measuring means arranged to measure the line current after power output from the rectifier station has been restored, and means arranged to set the current order of the second station in accordance with the measured value; and means arranged to cause a reduction of the minimum value of the control angle to the normal value after the measurement of the line current.

8. A plant according to claim 7, wherein said voltage sensing the time measuring means are adapted to also sense the line current and to influence the control angle limiting means for increasing the minimum value of the control angle only if both the line voltage is lower than said first predetermined value and the line current is lower than a predetermined, low value during said first time interval.

9. A plant according to claim 7, wherein said second station is provided with a second voltage sensing means adapted to initiate the measurement of the line current and setting of the current order in accordance therewith only if the line voltage, after having been lower than said first predetermined value, exceeds a second predetermined value.

10. A plant according to claim 9, wherein said second voltage sensing means is combined with a time measuring means and adapted to initiate the current measurement and the setting of the current order only if the line voltage exceeds said second predetermined value during a second time interval of a predetermined length.

11. A plant according to claim 7, wherein said second station is provided with means adapted to prevent said increase of the minimum value of the control angle upon a fault in the a.c. voltage network to which the second station is connected.

12. A plant according to claim 7, wherein each station comprises:

means adapted to be supplied with the measured line current for generating current orders, the generating means generates the current orders for the station by
  (a) adding to the measured current value an amount corresponding to the desired current margin, if the station operates as the rectifier station, and
  (b) subtracting from the measured current value an amount corresponding to the desired current margin, if the station operates as the inverter station.

13. A plant according to claim 7, wherein each station is provided with means adapted to initiate measurement of the line current and setting of the current order only if, prior thereto, an increase of the minimum value of the control angle has been initiated.

* * * * *